United States Patent [19]
Pawlik

[11] Patent Number: 5,147,157
[45] Date of Patent: Sep. 15, 1992

[54] ADJUSTABLE LEAF SPRING CARTRIDGE FOR FACE MILLS

[75] Inventor: James A. Pawlik, Sterling Heights, Mich.

[73] Assignee: GTE Valenite Corporation, Troy, Mich.

[21] Appl. No.: 741,386

[22] Filed: Aug. 7, 1991

[51] Int. Cl.⁵ .............................................. B26D 1/12
[52] U.S. Cl. ....................................... 407/36; 407/38; 407/89; 407/48
[58] Field of Search ....................... 407/40, 42, 53, 34, 407/36–39, 44–48, 81, 83, 89, 88, 103, 104, 84, 90; 408/714, 156, 187, 188, 180

[56] References Cited

U.S. PATENT DOCUMENTS

| | | | |
|---|---|---|---|
| 2,962,800 | 12/1960 | Swenson | 407/89 X |
| 4,194,860 | 3/1980 | Hopkins | 407/36 X |
| 4,470,731 | 9/1984 | Erkfritz | 407/36 X |
| 4,631,994 | 12/1986 | Jester et al. | 407/83 X |
| 4,848,977 | 7/1989 | Kieninger | 407/89 X |
| 4,927,301 | 5/1990 | Reiterman | 407/45 X |

FOREIGN PATENT DOCUMENTS

| | | | |
|---|---|---|---|
| 0039539 | 11/1981 | European Pat. Off. | 407/44 |
| 0222156 | 5/1987 | European Pat. Off. | 407/40 |
| 2615913 | 3/1976 | Fed. Rep. of Germany | 407/36 |
| 0426761 | 5/1974 | U.S.S.R. | 407/83 |

Primary Examiner—Larry I. Schwartz
Assistant Examiner—J. R. Daulton
Attorney, Agent, or Firm—Bill C. Panagos

[57] ABSTRACT

A face mill having one or more cartridges for adjustably supporting cutter inserts on the end face of the rotating tool body. Each cartridge has a convex arcuate surface seated against a concave arcuate seat surface formed on or in the milling tool body. A torsion leaf spring is integrally extended from the cartridge parallel to the axis of the concave seat surface. Also, a manual adjustment screw is located perpendicular to the axis of rotation of the cartridge for applying an adjustment force to the cartridge in opposition to the action of the torsion leaf spring. The torsion leaf spring applies a pre-load force to the cartridge. The manual adjustment screw exerts an opposing force that rotates the cartridge to a desired position for proper orientation of the associated cutter insert.

1 Claim, 2 Drawing Sheets

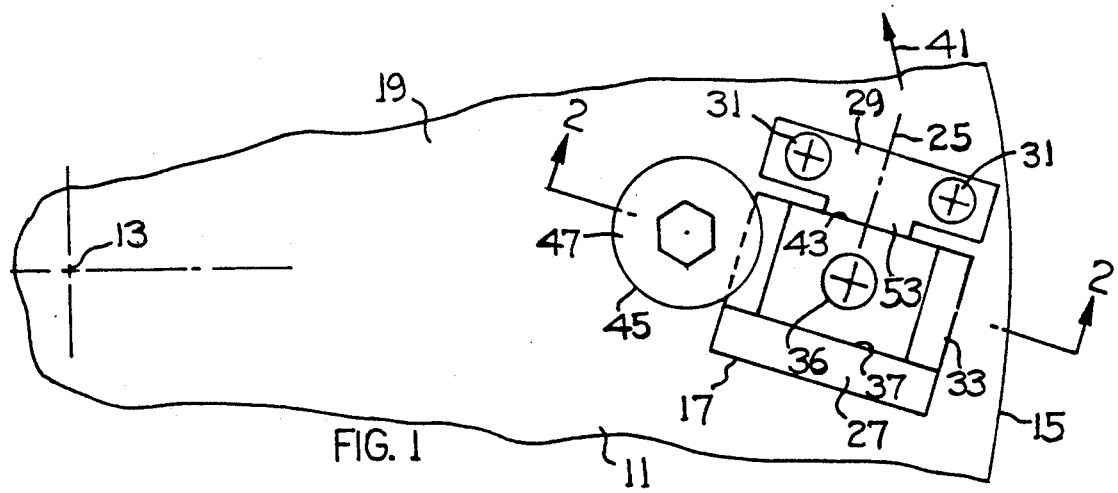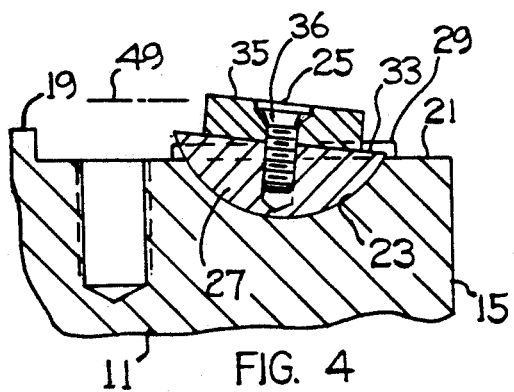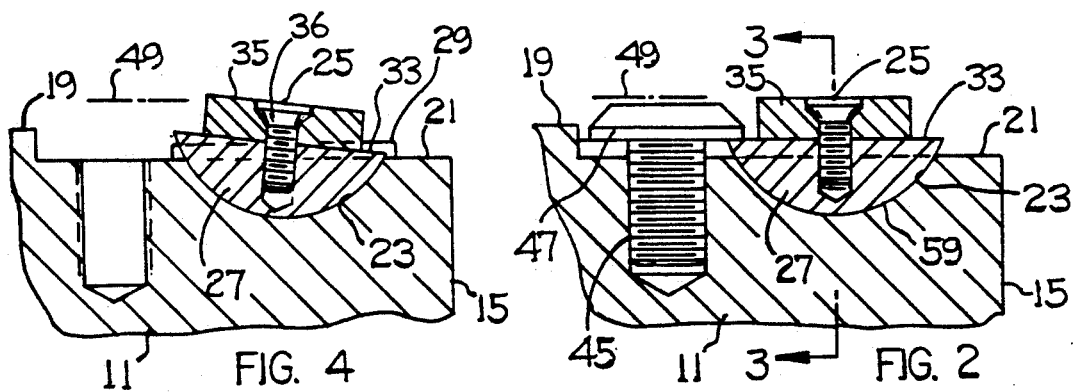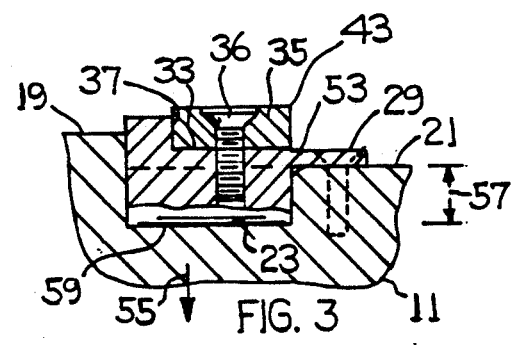

5,147,157

ADJUSTABLE LEAF SPRING CARTRIDGE FOR FACE MILLS

CROSS REFERENCE TO RELATED PATENT APPLICATION

This patent application relates to a face mill construction having some similarities to a face mill structure shown in a co-pending patent application filed in the names of James Pawlik and Raymond Stephens, and entitled "Adjustable Torsion Bar Cartridge for Face Mills".

FIELD OF THE INVENTION

This invention relates to metal cutting or surface finishing machines, particularly face mills having cutter inserts mounted thereon for machining relatively smooth flat surfaces on a workpiece passing across the cutting edges of the inserts.

BACKGROUND OF THE INVENTION

U.S. Pat. No. 4,194,860 to David Hopkins shows a face milling cutter wherein the cutting action is performed by cutter inserts clamped to a rotatable tool body at spaced points around the tool body periphery. Each cutter insert comprises a flat rectangular cutter having truncated corners. The rectangular cutters are oriented on the end face of the tool body so that the truncated corners have wiping engagement with the machined surface, whereby the final surface is relatively smooth.

In order to obtain smooth surface finishes it is preferred that the milling tool cutters rotate in a single radial plane normal to the axis of the machine spindle. However, it often happens that there is a slight tilt between the cutter edge plane and the machine spindle centerline. The effect of the undesired spindle tilt can be compensated for by making the cutters as individual inserts and incorporating an adjustment feature into each insert.

U.S. Pat. No. 4,470,731 to Donald Erkfritz discloses a milling tool cutter insert construction having a system of multiple set screws for adjusting the orientation of the cutter insert so as to overcome the effects of undesired spindle tilt.

U.S Pat. No. 4,927,301 to Lee Reiterman discloses a cutter insert cartridge usable on a boring bar having multiple screw adjustments for adjusting the positions of the cutting edge on the cutter insert. The cartridge has a convex arcuate surface contour seated in a concave arcuate seat or recess. One screw applies a spring pre-load to the cartridge for arcuate biasing it in one direction; a second manual adjustment screw can be operated to exert an opposing force on the cartridge, thereby overcoming the pre-load force and moving the cartridge to a desired position for properly orienting the associated cutter insert.

SUMMARY OF THE INVENTION

The present invention contemplates a face mill wherein the milling tool body has one or more arcuate concave segmental seats in its end face. A cutter insert-support cartridge is adjustably located on each seat so that each cartridge can be rockably adjusted to a position for overcoming undesired spindle tilt in the particular milling machine on which the invention is being used.

Each cartridge has a convex arcuate surface slidably positioned against the associated concave segmental seat surface, such that the cartridge can rock around the axis of the arcuate seat surface to adjust the position of the associated cutter insert. A spring leaf anchorage means extends from each cartridge to an anchorage point on the tool body for arcuately biasing the cartridge toward a predetermined position. Also, a manual adjustment screw is arranged perpendicular to the axis of rotation of the cartridge to apply an adjustment force in opposition to the spring leaf anchorage means.

By rotating the adjustment screw it is possible to rotate the cartridge around the arcuate seat axis, thereby adjusting the location or angulation of the cutting edge on the associated cutter insert.

An advantage of the proposed arrangement is that only a single screw needs to be adjusted in order to change the cutting edge position. Also, the system is suitable for achieving a relatively fine micrometer type adjustment of the cutter insert. Of further interest is the fact that the spring leaf anchorage means can be designed to give a relatively large pre-load force such that vibrational effects are not likely to disturb the adjusted position of the cutter insert.

THE DRAWINGS

FIG. 1 is a fragmentary plan view looking at the face of a milling tool embodying the invention.

FIG. 2 is a view taken along line 2—2 in FIG. 1.

FIG. 3 is a view taken on line 3—3 FIG. 2.

FIG. 4 is a view taken in the same direction as FIG. 2, but showing the componentry in a partially assembled condition.

DESCRIPTION OF A PREFERRED EMBODIMENT OF THE INVENTION

Figure 5:
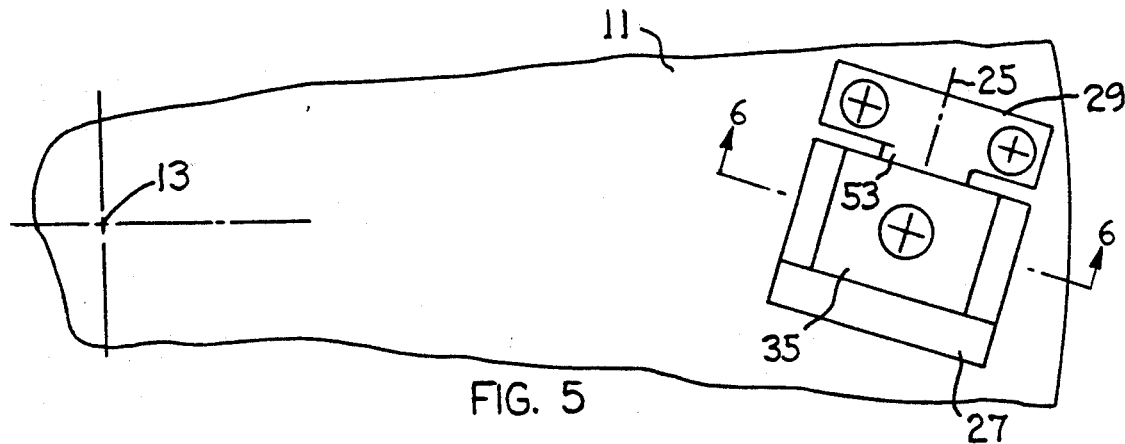
FIG. 5 is a view taken in the same direction as FIG. 1, but illustrating another form of the invention.
Figure 8:
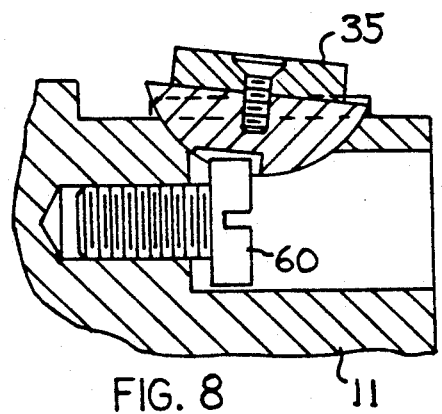
FIG. 8 is a view taken in the same direction as FIG. 6, but illustrating the mechanism in a partially assembled condition.

FIG. 1 fragmentarily shows a face milling tool that includes a milling tool body 11 having a rotational axis 13 and a cylindrical peripheral side surface 15. The drawing shows one illustrative cutter assembly 17 mounted on end face 19 of the milling tool body; additional cutter assemblies of a similar construction would, or could, be mounted on end face 19 of the tool body.

The illustrated cutter assembly comprises a concave arcuate segmental seat 23 formed in an undercut flat surface 21 of tool body end face 19. Seat 23 is an arcuate circular (cylindrical) surface having an axis 25. Rockably disposed on arcuate seat 23 is a cartridge 27.

A flat tab element 29 extends laterally from cartridge 27 for positionment on flat surface 21. Two clamp screws 31 extend through the tab element into tool body 11 to secure the cartridge in place. Tab element 29 is integrally connected to the cartridge via a short relatively flat neck structure 53. The neck structure is relatively wide, as seen in FIG. 1, but relatively narrow as viewed in FIG. 3. The neck structure is dimensioned to have the resilience and action of a flat leaf spring. The end portion of the spring connected to tab element 29 is anchored to tool body 11, whereas the end portion of the spring connected to cartridge body 27 exerts a resilient force acting on the cartridge body in the direction of arrow 55 (FIG. 3).

The cartridge may be initially constructed so that the spacing 57 between the tab element undersurface and the arcuate surface 59 of the cartridge body is slightly greater than the corresponding spacing between face 21 and arcuate seat surface 23. Therefore, when screws 31 are tightened the arcuate surface 59 of the cartridge will be in firm pressure contact with seat surface 23 (due to the resilient biasing action of leaf spring 53).

The cartridge has a flat positioner face 33 adapted to receive a cutter insert 35 thereon. A screw 36 extends through the cutter insert into the cartridge to removably secure the insert to the cartridge. A shoulder 37 is formed on the cartridge in facing relation to the cutting load to preclude rotation of the cutter insert relative to screw 36.

Tool body 11 is rotatable in the direction of arrow 41 (FIG. 1), whereby edge 43 of the cutter insert 35 engages the work to perform a cutting operation thereon. The cutter insert is designed to take only a small cut in the work, with a wiping action for achievement of a relatively smooth work surface.

The flat position face 33 on cartridge body 27 is initially formed to be at a slight angle to the general plane of tab element 29, as shown in FIG. 4. FIG. 4 shows generally the condition or position of the cartridge body after screws 31 have been tightened but prior to installation of an adjustment screw 45.

The manual adjustment screw 45 is threaded into a hole in tool body 11 at a location alongside cartridge 27 so that its head 47 overlies positioner face 33 of cartridge 27. By turning screw 45 it is possible to apply a downward force on the cartridge (in FIG. 2), such that the cutting edge of insert 35 is brought into a cutting plane 49 that is parallel to the finished face that is milled. This plane may not be normal to rotational axis 13. This action compensates for any potential tilt of the machine spindle and tool body 11.

Figure 6:
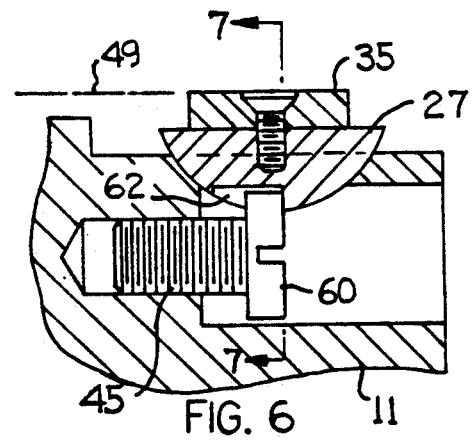
FIG. 6 is a sectional view on line 6—6 in FIG. 5.
Figure 7:
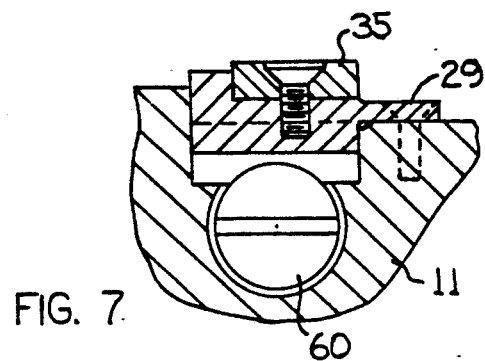
FIG. 7 is a sectional view on line 7—7 in FIG. 6.

An alternate manual adjustment is shown in FIG. 5 through 7. The manual adjustment screw is located below the cartridge 27 so that its head 60 engages in a slot 62 in the cartridge 27. By turning screw head 60 it is possible to apply a rotational force on the cartridge (in FIG. 6), such that the cutting edge of insert 35 is brought into a cutting plane 49 that is parallel to the finished face that is milled. This plane may not be normal to rotational axis 13. This action compensates for any potential tilt of the machine spindle and tool body 11.

Tab element 29 acts as a torsion leaf spring in the sense that downward movement of screw 45 causes head 47 to impart a torsional force to neck structure 53. The torsional stress within neck structure 53 acts as a pre-load force to keep cartridge face 33 in contact with the head of screw 45. The screw can be turned to various positions to achieve different settings of cutter insert 35, i.e. different angulations of cutting edge 43. Tab element 29 forms a torsional connection between cartridge 27 and tool body 11.

Tab element 29 exerts two biasing actions on cartridge 27. First, it exerts a force in the direction of arrow 55 for keeping arcuate surface 59 of the cartridge body in firm pressure contact with seat surface 23. Second, the tab element presets the cartridge to a slightly rotated position (FIG. 4), whereby screw 45 can be turned to apply a substantial pre-load force onto the cartridge body equipped with a single tab element 29. However, two oppositely extending tab elements could be used if so desired.

The drawings show one specific form of the invention. However, it will be appreciated that the invention could be practiced various forms.

What is claimed is:

1. A face mill comprising a milling tool body having a rotational axis and an end face extending generally transverse to the rotational axis; a concave arcuate segmental seat in said end face remote from said rotational axis; said seat having an arcuate seat surface centered on a second axis; a cutter insert support cartridge slideably and rockably positioned in said segmental seat for arcuate adjustment around said second axis; torsional spring leaf means integral with said cartridge for biasing said cartridge in a first arcuate direction; and a manual adjustment means for biasing said cartridge in a second arcuate direction; said spring leaf means comprising an anchoring tab element positioned on the tool body alongside the cartridge and a neck structure extending between the cartridge and tab element; said tab element and neck structure being integral with the cartridge; whereby operation of said manual adjustment means causes a torsion force to be exerted on the neck structure; said end face further equipped with two clamp screws extending through said tab element into the tool body, whereby the neck structure forms a torsional connection between the tool body and the cartridge; said neck structure has a flat rectangular cross section in which one cross sectional dimension is several times the other cross sectional dimension.

* * * * *